US012709670B1

(12) United States Patent
Kamble et al.

(10) Patent No.: US 12,709,670 B1
(45) Date of Patent: Aug. 18, 2026

(54) PROCESS FOR TREATING TEXTILE WASTE

(71) Applicant: MANGALORE REFINERY & PETROCHEMICALS LTD., Mangalore (IN)

(72) Inventors: Sanjay Pandurang Kamble, Pune (IN); Nishant Nandkishore Markandeya, Pune (IN); Narendra Bodawar, Pune (IN); Sunil Sitaram Bhongale, Pune (IN); Karthick Ramalingam, Mangalore (IN); Pramod Kumar Hegde, Mangalore (IN); Manjunatha Megur Ganesh Bhat, Mangalore (IN); Jatin Yadav, Mangalore (IN); Kirankumar Honnashamaiah, Mangalore (IN); Sathyanarayana Hanakere Channaiah, Mangalore (IN)

(73) Assignee: MANGALORE REFINERY & PETROCHEMICALS LTD., Mangalore (IN)

( * ) Notice: Subject to any disclaimer, the term of this patent is extended or adjusted under 35 U.S.C. 154(b) by 0 days.

(21) Appl. No.: 19/332,702

(22) Filed: Sep. 18, 2025

(51) Int. Cl.
*C08J 11/08* (2006.01)

(52) U.S. Cl.
CPC ............ *C08J 11/08* (2013.01); *C08J 2301/00* (2013.01)

(58) Field of Classification Search
USPC ............................................................ 521/49
See application file for complete search history.

(56) References Cited

FOREIGN PATENT DOCUMENTS

| | | | | |
|---|---|---|---|---|
| JP | 3808672 B2 * | 8/2006 | .............. | C08J 11/10 |
| WO | WO-2024070904 A1 * | 4/2024 | ............. | B29B 17/02 |

OTHER PUBLICATIONS

WO-2024070904-A1 Machine Translation (Year: 2024).*
JP-3808672-B2 Machine Translation (Year: 2006).*

* cited by examiner

*Primary Examiner* — Terressa Boykin
(74) *Attorney, Agent, or Firm* — The Roy Gross Law Firm, LLC; Roy D. Gross

(57) ABSTRACT

The present disclosure relates to a process for treating mixed textile waste comprising cotton, polyester, nylon, and spandex. The process is based on selective solubilization of different component polymers followed by controlled depolymerization, enabling efficient recovery. The process of the present disclosure is simple, cost-effective, and environmentally sustainable, providing a practical solution to the growing problem of mixed textile waste pollution.

11 Claims, 7 Drawing Sheets

PROCESS FOR TREATING TEXTILE WASTE

FIELD

The present disclosure relates to a process for treating textile waste. Particularly, the present disclosure relates to a process for the depolymerization and recycling of textile waste.

Definitions

As used in the present disclosure, the following terms are generally intended to have the meaning as set forth below, except to the extent that the context in which they are used to indicate otherwise.

Depolymerization: The term "Depolymerization" refers to a process or act of breaking down a polymer into its monomeric components.

Decolorization: The term "Decolorization" refers to a process of removing colored organic impurities from the sample mixture.

Textile waste: The term "Textile waste" refers to synthetic and natural materials made from polymers such as polyamides, terephthalates and the like. It may also contain cellulose and/or polyurethanes. The textile waste can be in the form of fabric, yarn, thread, fiber and the like and can include whole or shredded garments and any other article made from these fibers.

Mixed fabric: The term "Mixed fabric" also known as "blended textile" refers to a textile fabric composed of two or more kind of fibers. Further, the term mixed textile waste in the present disclosure also refers to the textile waste obtained from various sources such as a mixture of blue jeans and colored shirts and the like.

Decolorizing agent: The term "Decolorizing agent" refers to a chemical compound used to decolorize the mixed textile waste.

APHA values: The term "APHA values" refer to the color measurement of clear liquids using the APHA (American Public Health Association) color scale, also known as the Platinum-Cobalt (Pt—Co) scale.

BACKGROUND

The background information herein below relates to the present disclosure but is not necessarily prior art.

The textile industry produces a substantial amount of textile waste every year. The textile waste produced by the textile industries is needed to be recycled to convert it into a value-added product. The textile waste is conventionally recycled by chemical and mechanical recycling methods. The waste fabric is recycled by mechanical recycling method to produce value added products such as yarns, fibers, wiper, fiber material, prespun fibers and the like.

Conventionally, chemical recycling processes for recycling of fabric/textile waste involves pyrolysis, enzymatic hydrolysis, gasification, glycolysis, ammonolysis hydrothermal method and the like. Chemical recycling process is used to obtain value-added products such as monomers by recycling the textile waste or mixed textile waste s such as cotton, polyester, polyamides and the like.

Blended fabrics like cotton-polyester are widely used for their enhanced comfort, durability, and cost-effectiveness, but their mixed composition makes recycling challenging. Synthetic fibers do not degrade naturally, and even cotton decomposes slowly, leading to significant landfill accumulation and environmental harm. Recycling such mixed textile waste not only mitigates pollution and conserves land but also recovers valuable raw materials, making it essential for both ecological and economic sustainability.

Therefore, there is felt a need to provide a process for the depolymerization and recovery of polymers from textile waste that mitigates the aforementioned drawbacks or at least provides a useful alternative.

OBJECTS

Some of the objects of the present disclosure, which at least one embodiment herein satisfies, are as follows:

It is an object of the present disclosure to ameliorate one or more problems of the background or to at least provide a useful alternative.

Another object of the present disclosure is to provide a process for the depolymerization and recovery of a textile waste.

Still another object of the present disclosure is to provide a process for the recycling of a mixed textile waste.

Yet another object of the present disclosure is to provide a process for the decolorization of a textile waste.

Yet another object of the present disclosure is to provide a process for sequential or simultaneous decolorization and depolymerization of a textile waste.

Still another object of the present disclosure is to provide an environmentally sustainable process for recycling of a textile waste.

Yet another object of the present disclosure is to provide an efficient process for the recycling of a textile waste.

Still another object of the present disclosure is to provide a simple and economical process for the recycling of a textile waste.

Other objects and advantages of the present disclosure will be more apparent from the following description, which is not intended to limit the scope of the present disclosure.

SUMMARY

The present disclosure relates to a process for treating a textile waste, the process comprises the steps of:

a) mixing a textile waste in a first fluid medium under stirring at a first predetermined temperature for a first predetermined time period to obtain a first mixture comprising a first filtrate and first solids containing undissolved textile waste followed by separating to obtain a separated first filtrate and a separated first solids; and subjecting the separated first filtrate to a predetermined method to obtain nylon;

b) optionally mixing the separated first solids in a second fluid medium under stirring at a second predetermined temperature for a second predetermined time period to obtain a second mixture comprising a second filtrate and second solids containing undissolved textile waste followed by separating to obtain a separated second filtrate and a separated second solids; and subjecting the separated second filtrate to a predetermined method to obtain spandex;

c) depolymerizing the separated first solids or the separated second solids in a third fluid medium by using a nucleophilic agent at a third predetermined temperature for a third predetermined time period to obtain third mixture comprising a third filtrate and third solids containing undissolved textile waste followed by separating to obtain a separated third filtrate and a separated third solids; and subjecting the separated third filtrate to a predetermined method to obtain Bis(2-hydroxyethyl) terephthalate; and d) optionally treating the separated third solids in an aqueous acid solution at a fourth predetermined temperature for a fourth predetermined time period to obtain microcrystalline cellulose.

In an embodiment of the present disclosure, the first solids, the second solids and the third solids are independently dried before subjecting to next step.

In an embodiment of the present disclosure, the first solids and the second solids are independently decolorized prior to or after depolymerization, wherein a. the decolorization of the first solids prior to depolymerization is carried out by immersing the first solids in a decolorizing agent at a temperature in the range of 100° C. to 160° C. for a time period in the range of 1 hour to 6 hours followed by separating to obtain a decolorized product; and b. the decolorization of the second solids after depolymerization is carried out by immersing the second solids in a decolorizing agent at a temperature in the range of 100° C. to 160° C. for a time period in the range of 1 hour to 6 hours followed by separating to obtain a decolorized product.

In an embodiment of the present disclosure, the predetermined method is at least one selected from the group consisting of cooling, filtration, rotary evaporation, drying, distillation, centrifugation, skimming, settling, by using agitated thin film dryer (ATFD), by using short path distillation unit (SPDU), and by adding an anti-solvent to obtain solids.

In an embodiment of the present disclosure, the first fluid medium, the second fluid medium, the third fluid medium and the nucleophilic agent is recovered in each respective step.

In an embodiment of the present disclosure, the first fluid medium is at least one selected from the group consisting of formic acid (FA), propanediol (PDO), dimethyl sulfoxide (DMSO), hydrogen peroxide, acetic acid, formic acid, chloro acetic acid, acrylic acid, benzoic acid, propionic acid, butyric acid, methacrylic acid, and isobutyric acid.

In an embodiment of the present disclosure, the second fluid medium is at least one selected from the group consisting of tetrahydrofuran (THF), N,N-dimethylformamide (DMF), N,N-dimethylacetamide (DMAc), dimethyl sulfoxide (DMSO) and N-methylpyrrolidone (NMP).

In an embodiment of the present disclosure, the third fluid medium is at least one selected from the group consisting of dimethylformamide, ethylamine, dimethylamine, aniline, pyridine and imidazole-based solvents.

In an embodiment of the present disclosure, the nucleophilic agent is at least one selected from ethylene glycol and water.

In an embodiment of the present disclosure, aqueous acid solution is at least one selected from the group consisting of aqueous acetic acid, aqueous citric acid, aqueous lactic acid, aqueous formic acid, aqueous oxalic acid, aqueous tartaric acid, aqueous sulphuric acid, and aqueous hydrochloric acid.

In an embodiment of the present disclosure, the concentration of the aqueous acid solution is in the range of 5 mass % to 70 mass %.

In an embodiment of the present disclosure, the first predetermined temperature and the second predetermined temperature are independently in the range of 40° C. to 120° C.

In an embodiment of the present disclosure, the third predetermined temperature is in the range of 170° C. to 200° C.

In an embodiment of the present disclosure, the fourth predetermined temperature is in the range of 30° C. to 80° C.

In an embodiment of the present disclosure, the first predetermined time period is in the range of 30 minutes to 240 minutes.

In an embodiment of the present disclosure, the second predetermined time period is in the range of 30 minutes to 240 minutes.

In an embodiment of the present disclosure, the third predetermined time period is in the range of 20 minutes to 150 minutes.

In an embodiment of the present disclosure, the fourth predetermined time period is in the range of 15 minutes to 240 minutes.

In an embodiment of the present disclosure, the decolorizing agent is at least one selected form the group consisting of aqueous sodium hydroxide, aqueous sodium dithionite, aqueous sodium hydrosulfide, aqueous sodium hydrogen sulphate, aqueous potassium hydroxide, aqueous calcium hydroxide, aqueous ammonia, aqueous sodium sulfite, aqueous sodium carbonate, 1-methylimidazole, aqueous potassium hydrogen phthalate, aqueous calcium hypochlorite, aqueous sodium dihydrogen phosphate, aqueous potassium persulphate, aqueous ammonium sulphate, aqueous sodium thiosulphate, and aqueous sodium lauryl sulphate.

In an embodiment of the present disclosure, the depolymerization is done prior to the recovery of nylon, spandex and microcrystalline cellulose.

In an embodiment of the present disclosure, the decolorization after depolymerization results in a slightly colored BHET which is further decolorized by dissolving the slightly colored BHET in water and heating to a temperature in the range of 60° C. to 80° C. followed by passing through an activated charcoal bed and subjecting to recrystallization to obtain white BHET crystals.

BRIEF DESCRIPTION OF THE ACCOMPANYING DRAWING

The present disclosure will now be described with the help of the accompanying drawing, in which.

Figure 10A:
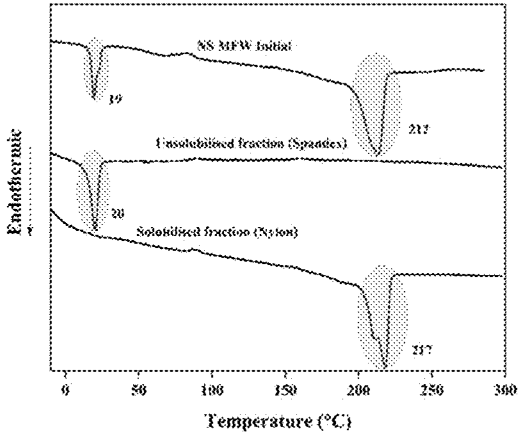

FIG. 10*a* illustrates the DSC thermogram of nylon dissolution step for both insolubilized and solubilized fraction (for NS MFW treatment)

Figure 10B:
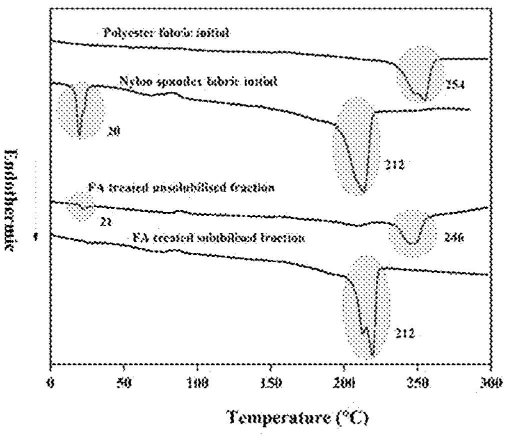
Figure 11:
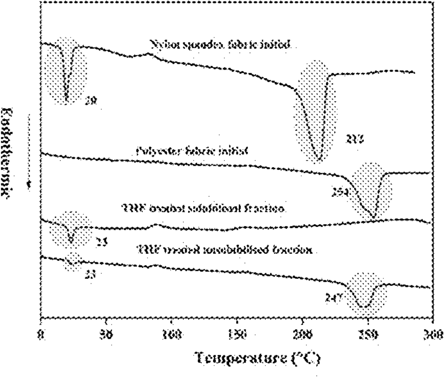
Figure 12A:
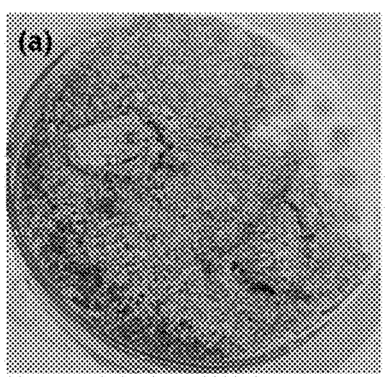
Figure 12B:
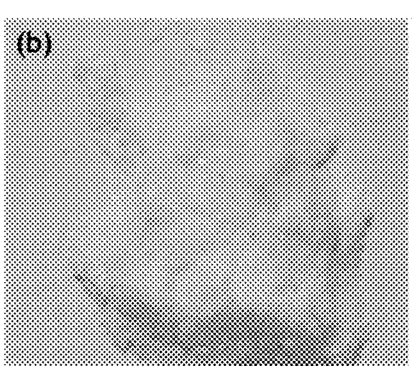

FIG. 10*b* illustrates the DSC thermogram for formic acid (FA) treated CPNS MFW in accordance with the present disclosure; and FIG. 11 illustrates the DSC thermogram analysis for THF treated CPS MFW in accordance with the present disclosure; and FIG. 12*a* illustrates isolated BHET slightly orange in color in accordance with the present disclosure; and FIG. 12*b* illustrates BHET when further dissolved in hot water and subjected to Activated carbon (AC) treatment is white in color in accordance with the present disclosure.

DETAILED DESCRIPTION

The present disclosure relates to a process for treating textile waste. Particularly, the present disclosure relates to a process for the depolymerization and recycling of textile waste.

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer, or section. Terms such as first, second, third etc., when used herein do not imply a specific sequence or order unless clearly suggested by the present disclosure.

The textile industry produces a substantial amount of textile waste every year. The textile waste produced by the textile industries is needed to be recycled to convert it into a value-added product. The textile waste is conventionally recycled by chemical and mechanical recycling methods. The waste fabric is recycled by mechanical recycling method to produce value added products such as yarns, fibers, wiper, fiber material, prespun fibers and the like.

Conventionally, chemical recycling processes for recycling of fabric/textile waste involves pyrolysis, enzymatic hydrolysis, gasification, glycolysis, ammonolysis hydrothermal method and the like. Chemical recycling process is used to obtain value-added products such as monomers by recycling the textile waste or mixed textile waste s such as cotton, polyester, polyamides and the like. The decolorization of the mixed textile waste by conventional chemical recycling process is still a challenge. Further, there is no report on the recycling of mixed textile waste using solvothermal techniques.

The term textile waste (FW) and mixed textile waste (MFW) are used interchangeably throughout the specification.

The present disclosure relates to a process for treating a textile waste or a mixed textile waste (MFW), the process comprises the steps of mixing nylon from a textile waste in a first fluid medium under stirring at a first predetermined temperature for a first predetermined time period to obtain a first mixture comprising a first filtrate and first solids containing undissolved textile waste followed by separating to obtain a separated first filtrate and a separated first solids; and subjecting the separated first filtrate to a predetermined method to obtain nylon. Optionally, the separated first solids are mixed in a second fluid medium under stirring at a second predetermined temperature for a second predetermined time period to obtain a second mixture comprising a second filtrate and second solids containing undissolved textile waste followed by separating to obtain a separated second filtrate and a separated second solids; and subjecting the separated second filtrate to a predetermined method to obtain spandex. The separated second solids are depolymerized in a third fluid medium by a nucleophilic agent at a third predetermined temperature for a third predetermined time period to obtain a third mixture comprising a third filtrate and third solids containing undissolved textile waste followed by separating to obtain a separated third filtrate and a separated third solids; and subjecting the separated third filtrate to a predetermined method to obtain Bis(2-hydroxyethyl) terephthalate. Optionally, the separated third solids are treated in an aqueous acid solution at a fourth predetermined temperature for a fourth predetermined time period to obtain microcrystalline cellulose.

The process is described in detail below.

A textile waste is mixed in a first fluid medium under stirring at a first predetermined temperature for a first predetermined time period to obtain a first mixture comprising a first filtrate and first solids containing undissolved textile waste followed by separating to obtain a separated first filtrate and a separated first solids; and subjecting the separated first filtrate to a predetermined method to obtain nylon.

In an embodiment of the present disclosure, the first fluid medium is at least one selected from the group consisting of formic acid, propanediol (PDO), dimethyl sulfoxide (DMSO), hydrogen peroxide, acetic acid, chloro acetic acid, acrylic acid, benzoic acid, propionic acid, butyric acid, methacrylic acid, and isobutyric acid. In an exemplary embodiment, the first fluid medium is formic acid.

In an embodiment of the present disclosure, the first predetermined temperature is in the range of 40° C. to 120° C. In an exemplary embodiment, the first predetermined temperature is 70° C.

In an embodiment of the present disclosure, the first predetermined time period is in the range of 30 minutes to 240 minutes. In an exemplary embodiment, the first predetermined time period is 120 minutes.

In an embodiment of the present disclosure, the first filtrate contains solubilized nylon and the first fluid medium.

In an embodiment of the present disclosure, the predetermined method is at least one selected from the group consisting of cooling, filtration, rotary evaporation, drying, distillation, centrifugation, skimming, settling, by using agitated thin film dryer (ATFD) and by using short path distillation unit (SPDU), and by adding an anti-solvent to obtain solids.

In an embodiment of the present disclosure, the predetermined method is rotary evaporation.

In an embodiment of the present disclosure, the separated first filtrate was sent to a rotary evaporator to recover nylon and the first fluid medium.

In an embodiment of the present disclosure, the first solids contain undissolved textile waste comprising cotton, polyester and Spandex (CPS MFW).

Optionally, the separated first solids are mixed in a second fluid medium under stirring at a second predetermined temperature for a second predetermined time period to obtain a second mixture comprising a second filtrate and second solids containing undissolved textile waste followed by separating to obtain a separated second filtrate and a separated second solids; and subjecting the separated second filtrate to a predetermined method to obtain spandex.

In an embodiment of the present disclosure, the second fluid medium is at least one selected from the group consisting of tetrahydrofuran (THF), N,N-dimethylformamide (DMF), N,N-dimethylacetamide (DMAc), dimethyl sulfoxide (DMSO) and N-methylpyrrolidone (NMP). In an exemplary embodiment, the second fluid medium is tetrahydrofuran (THF).

In an embodiment of the present disclosure, the second predetermined temperature is in the range of 40° C. to 120° C. In an exemplary embodiment, the second predetermined temperature is 60° C.

In an embodiment of the present disclosure, the second predetermined time period is in the range of 30 minutes to 240 minutes. In an embodiment of the present disclosure, the second predetermined time period is 120 minutes.

In an embodiment of the present disclosure, the second filtrate contains solubilized spandex and the second fluid medium.

In an embodiment of the present disclosure, the predetermined method is at least one selected from the group consisting of cooling, filtration, rotary evaporation, drying, distillation, centrifugation, skimming, settling, by using agitated thin film dryer (ATFD) and by using short path distillation unit (SPDU), and by adding an anti-solvent to obtain solids.

In an embodiment of the present disclosure, the predetermined method is rotary evaporation.

In an embodiment of the present disclosure, the separated second filtrate is processed through a rotary evaporator to recover spandex and the second fluid medium.

In an embodiment of the present disclosure, the second solids contain undissolved textile waste comprising cotton and polyester (CP MFW).

In an embodiment of the present disclosure, the second solids are decolorized prior to or after depolymerization.

In an embodiment of the present disclosure, the decolorization of the first solids prior to depolymerization is carried out by immersing the first solids in a decolorizing agent at a temperature in the range of 100° C. to 160° C. for a time period in the range of 1 hour to 6 hours followed by separating to obtain a decolorized product.

In an embodiment of the present disclosure, the decolorizing agent is at least one selected form the group consisting of aqueous sodium hydroxide, aqueous sodium dithionite, aqueous sodium hydrosulfide, aqueous sodium hydrogen sulphate, aqueous potassium hydroxide, aqueous calcium hydroxide, aqueous ammonia, aqueous sodium sulfite, aqueous sodium carbonate, 1-methylimidazole, aqueous potassium hydrogen phthalate, aqueous calcium hypochlorite, aqueous sodium dihydrogen phosphate, aqueous potassium persulphate, aqueous ammonium sulphate, aqueous sodium thiosulphate, and aqueous sodium lauryl sulphate. In an exemplary embodiment, the decolorizing agent is aqueous sodium hydrogen sulphate. In another exemplary embodiment, the decolorizing agent is aqueous sodium hydroxide. In yet another exemplary embodiment, the decolorizing agent is aqueous sodium sulfite. In still another exemplary embodiment, the decolorizing agent is aqueous sodium dithionite. In still another exemplary embodiment, the decolorizing agent is 1-methylimidazole.

In an exemplary embodiment, the decolorizing agent is 5 mass % aqueous sodium hydrogen sulphate. In another exemplary embodiment, the decolorizing agent is 1-methylimidazole.

In an embodiment of the present disclosure, the decolorization of the second solids prior to depolymerization is carried out by immersing the second solids in a decolorizing agent at a temperature in the range of 100° C. to 160° C. for a time period in the range of 1 hour to 6 hours followed by separating to obtain a decolorized product.

In an exemplary embodiment, the decolorization of the second solids after depolymerization is carried out by immersing the second solids in a 5 mass % aqueous sodium hydrogen sulphate at 150° C. for 4 hours followed by separating to obtain a decolorized product.

In an exemplary embodiment, the decolorization of the first solids after depolymerization is carried out by immersing the first solids in a 5 mass % aqueous sodium hydrogen sulphate at 150° C. for 4 hours followed by separating to obtain a decolorized product.

The separated first solids or the separated second solids are depolymerized in a third fluid medium by a nucleophilic agent at a third predetermined temperature for a third predetermined time period to obtain a third mixture comprising a third filtrate and third solids containing undissolved textile waste followed by separating to obtain a separated third filtrate and a separated third solids; and subjecting the separated third filtrate to a predetermined method to obtain Bis(2-hydroxyethyl) terephthalate (de-polymerized polyethylene).

In an embodiment of the present disclosure, the third fluid medium is at least one selected from the group consisting of dimethylformamide, ethylamine, dimethylamine, aniline, pyridine and imidazole-based solvents. In an exemplary embodiment, the third fluid medium is dimethylformamide.

In an embodiment of the present disclosure, the nucleophilic agent is selected from ethylene glycol and water. In an exemplary embodiment, the nucleophilic agent is ethylene glycol.

In an embodiment of the present disclosure, the third predetermined temperature is in the range of 170° C. to 200° C. In an exemplary embodiment, the third predetermined temperature is 190° C. In another exemplary embodiment, the third predetermined temperature is 185° C.

In an embodiment of the present disclosure, the third predetermined time period is in the range of 20 minutes to 150 minutes. In an exemplary embodiment, the third predetermined time period is 120 minutes.

In an embodiment of the present disclosure, the third filtrate contains polyester depolymerization crude, the third fluid medium and the nucleophilic agent.

In an embodiment of the present disclosure, the predetermined method is at least one selected from the group consisting of cooling, filtration, rotary evaporation, drying, distillation, centrifugation, skimming, settling, by using agitated thin film dryer (ATFD) and by using short path distillation unit (SPDU), and by adding an anti-solvent to obtain solids.

In an embodiment of the present disclosure, the predetermined method is drying by using agitated thin film dryer (ATFD). In another embodiment of the present disclosure, the predetermined method is distillation by using short path distillation unit (SPDU).

In an exemplary embodiment, the third filtrate is sent to an Agitated Thin Film Drier (ATFD), where solvent recovery takes place and a concentrated third filtrate (containing BHET and oligomers) is obtained as a slurry after addition of water. The ATFD is operated at a temperature in the range of 100° C. to 250° C. and at a vacuum in the range of 10 mbar to 900 mbar to recover the third fluid medium and the nucleophilic agent. The concentrated third filtrate slurry is transferred to an oligomer separation tank, where water (anti-solvent) is added to separate the oligomers from the BHET solution. The separated oligomers are dried, while the BHET solution is fed to a crystallizer, where BHET is crystallized to obtain pure BHET. The so-obtained pure BHET is dried to obtain pure BHET powder.

In an embodiment of the present disclosure, the third solids contain undissolved textile waste comprising cotton (PDP MFW).

In another exemplary embodiment, the separated third filtrate is fed to a short path distillation unit (SPDU), where solvent recovery takes place. The SPDU is operated at a temperature in the range of 100° C. to 250° C. and at a vacuum in the range of 10 mbar to 900 mbar to recover the third medium and the nucleophilic agent. The more volatile component is collected in top while the less volatile component is collected through the middle stream. The concentrated third filtrate is then transferred to an oligomer separation tank, where an anti-solvent is added to separate the oligomers from the concentrated BHET solution. The separated oligomer is dried. The BHET solution is fed to a crystallizer, where BHET is crystallized to obtain pure BHET. The pure BHET is dried to obtain pure BHET powder (depolymerized polyethylene).

Optionally, the separated third solids are treated in an aqueous acid solution at a fourth predetermined temperature for a fourth predetermined time period to obtain microcrystalline cellulose (MCC).

In an embodiment of the present disclosure, the aqueous acid solution is at least one selected from the group consisting of aqueous acetic acid, aqueous citric acid, aqueous lactic acid, aqueous formic acid, aqueous oxalic acid, aqueous tartaric acid, aqueous sulphuric acid and aqueous hydrochloric acid. In an exemplary embodiment, the acid is aqueous oxalic acid. In another exemplary embodiment, the aqueous acid is aqueous citric acid. In yet another exemplary embodiment, the aqueous acid solution is aqueous sulphuric acid.

In an embodiment of the present disclosure, the concentration of the aqueous acid solution is in the range of 5 mass % to 70 mass %.

In an exemplary embodiment, the third solids are treated with 10 mass % aqueous oxalic acid. In an exemplary embodiment, the third solids are treated with 10 mass % aqueous citric acid. In an exemplary embodiment, the third solids are treated with 28 mass % aqueous sulphuric acid. In an embodiment of the present disclosure, the fourth predetermined temperature is in the range of 30° C. to 80° C. In an exemplary embodiment, the fourth predetermined temperature is 50° C.

In an embodiment of the present disclosure, the fourth predetermined time period is in the range of 15 minutes to 240 minutes. In an exemplary embodiment, the fourth predetermined time period is 180 minutes. In another exemplary embodiment, the fourth predetermined time period is 60 minutes.

In an embodiment of the present disclosure, the separated first solids, the separated second solids and the separated third solids are independently dried before subjecting to next step.

In an embodiment of the present disclosure, a decolorization is carried out on BHET.

In an embodiment of the present disclosure, the decolorization of the BHET is carried out by immersing the BHET in a decolorizing agent at a temperature in the range of 100° C. to 160° C. for a time period in the range of 1 hour to 6 hours followed by separating to obtain a decolorized BHET.

In an embodiment of the present disclosure, the decolorization after the depolymerization results in a slightly colored BHET which is further decolorized by dissolving the slightly colored BHET in water and heated to a temperature in the range of 60° C. to 80° C. followed by passing through an activated charcoal bed to obtain a decolorized BHET solution and subjecting the decolorized BHET solution to recrystallization to obtain white BHET crystals.

In an exemplary embodiment, BHET is dissolved in water at 70° C. and passed in an activated charcoal bed to obtain post treated BHET, which was further recrystallized to obtain decolorized BHET.

In an embodiment of the present disclosure, the first fluid medium, the second fluid medium, the third fluid medium and the nucleophilic agent is recovered in each respective step.

In an embodiment of the present disclosure, the first solids or the second solids are decolorized prior to or after depolymerization, wherein the decolorization is carried out by immersing the first solids or the second solids in a decolorizing agent at a temperature in the range of 100° C. to 160° C. for a time period in the range of 1 hour to 6 hours followed by separating to obtain a decolorized product (decolorized MFW).

The process of the present disclosure for the depolymerization and recovery of polymers from mixed textile waste offers significant advantages over conventional methods, particularly in terms of ease of operation, efficient recycling, and reagent reuse. Unlike traditional mechanical recycling or high-temperature pyrolysis, which require strict process control and often degrade polymer quality, this method employs sequential solubilization and selective recovery, ensuring high-purity polymer separation under moderate conditions. The stepwise approach significantly reduces non-recyclable waste, minimizing the need for landfilling or incineration by converting textile waste into valuable raw materials such as bis(2-hydroxyethyl terephthalate) (BHET) and microcrystalline cellulose (MCC). Additionally, the method incorporates efficient solvent recovery and reuse, reducing the consumption of fresh reagents and lowering overall process costs. By utilizing techniques such as controlled distillation, anti-solvent separation, and filtration, the loss of chemicals is minimized, making the process economically viable and environmentally sustainable. Overall, the process of the present disclosure provides a superior, scalable, and eco-friendly solution for mixed textile waste recycling, aligning with global sustainability goals.

The foregoing description of the embodiments has been provided for purposes of illustration and not intended to limit the scope of the present disclosure. Individual components of a particular embodiment are generally not limited to that particular embodiment, but are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1: a Process for the Recovery of Polymers and Depolymerization of Mixed Textile Waste (MFW) in Accordance with the Present Disclosure

List of Acronyms

Throughout the specification, the terms textile waste and mixed textile waste (MFW) are used interchangeably.

CPNS MFW—a mixed textile waste comprising cotton, polyester, nylon and spandex

CPS MFW—first solids containing cotton, polyester and spandex

CP MFW—second solids containing cotton and polyester

PDP MFW—third solids containing cotton containing polyester depolymerized MFW

MCC—microcrystalline cellulose

DC CP MFW—decolorized mixed textile waste containing cotton and polyester

C-PET—Colored Polyethylene terephthalate

A mixed textile waste comprising cotton, polyester, nylon and spandex (CPNS MFW) was obtained. The collected CPNS MFW was shredded and characterized through Fourier Transform Infrared Spectroscopy (FTIR) and Differential Scanning calorimetry (DSC) to determine its polymer composition. The depolymerization and recovery were carried out in either a high pressure reactor with a thermocouple, pressure transducer, and agitator or in a round bottom flask.

Example 1

Step 1

15 g of CPNS MFW was mixed in 100 g of formic acid (first fluid medium) under stirring at 70° C. for 2 hours to obtain a first mixture comprising a first filtrate and first solids. The first mixture was filtered to obtain a separated first filtrate (containing nylon) and separated first solids (containing cotton, polyester and spandex CPS MFW).

98 g of the so obtained separated first filtrate was sent to a rotary evaporator (predetermined method) to obtain 92 g of formic acid and 4.42 g of solubilized nylon fraction (confirmed by DSC).

Step 2

The separated first solids (CPS MFW) were dried and mixed with 100 g of tetrahydrofuran (THF) (second fluid medium) and heated to 60° C. for 2 hours to obtain a second mixture comprising a second filtrate and second solids.

102 g of the second mixture was filtered to obtain a separated second filtrate and separated second solids (CP MFW). 88 g of the so obtained separated second filtrate was processed through rotary evaporation (predetermined method) to recover 84 g of THF (second fluid medium) and 0.48 g of solubilized spandex (confirmed by DSC).

Step 3

The separated second solids (CP MFW) were dried and 10.05 g of the dried separated second solids were immersed in 5 mass % aqueous sodium hydrogen sulphate (decolorizing agent) (prepared by mixing 10 g sodium hydrogen sulphate in 200 ml water) and heated to 150° C. for 4 hours to obtain a decolorized product. The so obtained decolorized product was cooled to room temperature (27° C.) to obtain a cooled decolorized textile waste. 9.73 g of the cooled decolorized textile waste was further immersed in 75 g of dimethylformamide (third fluid medium) and 75 g of ethylene glycol (nucleophilic agent) and heated to 190° C. for 2 hours to obtain a third mixture comprising a third filtrate and third solids. The third mixture was filtered to obtain a separated third filtrate and separated third solids containing undissolved solid waste (polyester depolymerized MFW or PDP MFW).

The separated third filtrate was fed to an Agitated Thin Film Drier (ATFD) (predetermined method), where solvent recovery took place and a concentrated third filtrate (containing BHET and oligomers) was obtained as a slurry. The ATFD was operated at 150° C. and at 200 mbar vacuum to recover the third fluid medium and the nucleophilic agent. The concentrated third filtrate slurry was transferred to an oligomer separation tank (OL-01 A), where water (anti-solvent) was added to separate the oligomers from Bis(2-hydroxyethyl) terephthalate (BHET) solution. The separated oligomers were dried, while the BHET solution was fed to a crystallizer CR-01 A, where BHET was crystallized to obtain pure BHET.

Figure 1:
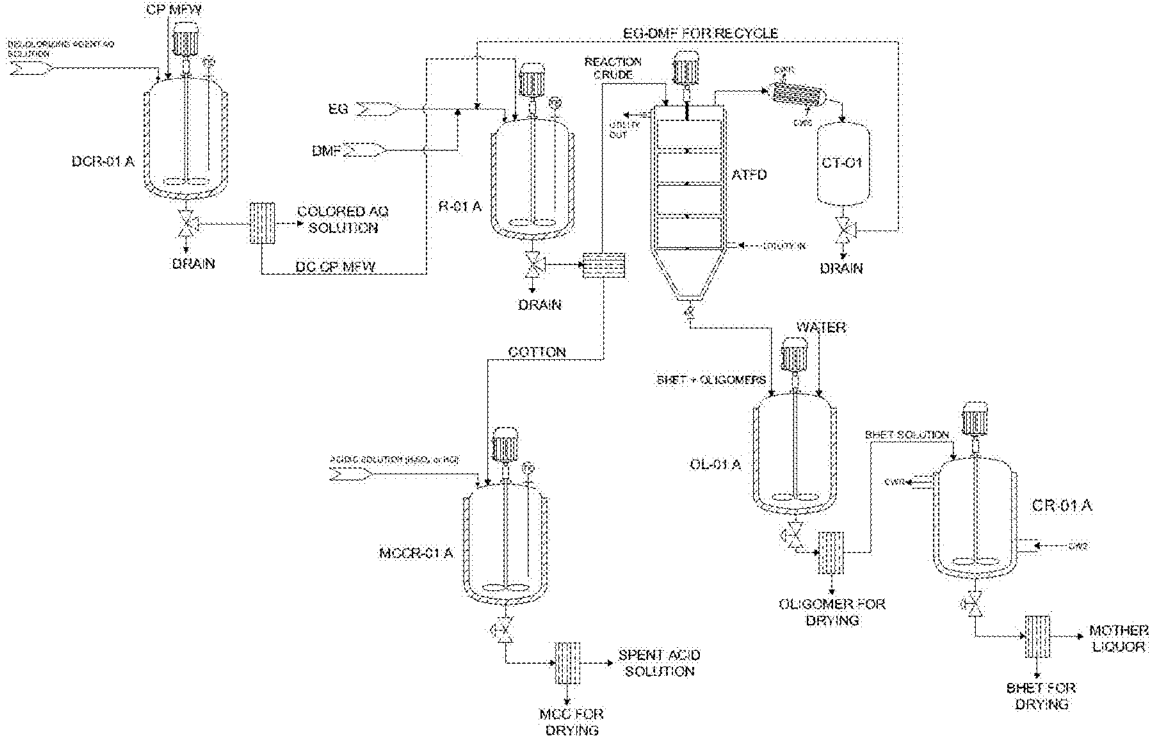
FIG. 1 illustrates the complete process for recycling of MFW and the use of Agitated Thin Film Dryer (ATFD) for the downstream processing of the reaction crude obtained after polyester depolymerization in accordance with the present disclosure.

The so-obtained pure BHET was dried to obtain pure BHET powder (depolymerized polyethylene) as illustrated in FIG. 1.

Step 4

The separated third solids (PDP MFW) were dried and cooled and 5.79 g of the cooled and dried PDP MFW was further treated with 10 mass % oxalic acid solution (prepared by dissolving 10 g of oxalic acid in 100 ml of water) and heated to 50° C. for 3 hours to obtain microcrystalline cellulose (MCC) or depolymerized products (depolymerized cotton).

Example 2 (Recovery of Polymers and Depolymerization of Mixed Fabric Waste Containing Cotton, Polyester, Nylon and Spandex (CPNS MFW)

Figure 2:
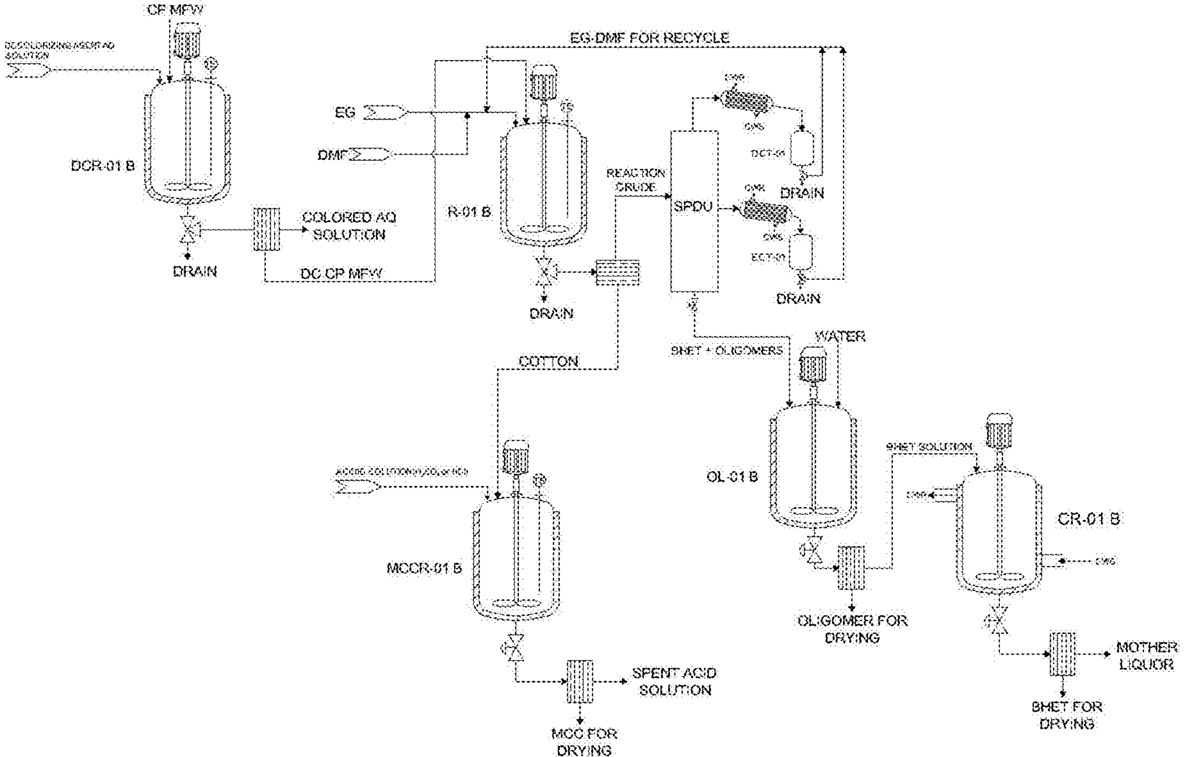
FIG. 2 illustrates the complete process for recycling of MFW and the use of Short Path Distillation Unit (SPDU) for the downstream processing of the reaction crude obtained after polyester depolymerization in accordance with the present disclosure.

Example 2 was carried out in a manner similar to Example 1, except in step 3, the third filtrate was fed to a Short Path Distillation Unit (SPDU), where solvent recovery took place. The SPDU was operated at 150° C. and 200 mbar vacuum to recover the DMF and the ethylene glycol. The more volatile component DMF was collected in top DCT-01 (DMF collection tank) while the less volatile component ethylene glycol was collected through the middle stream ECT-01 (EG collection tank). The concentrated third filtrate was then transferred to an oligomer separation tank (OL-01B), where water (anti-solvent) was added to separate the oligomers from the concentrated BHET solution. The separated oligomer was dried. The BHET solution was fed to a crystallizer CR-01B, where BHET was crystallized to obtain pure BHET. The pure BHET was dried to obtain pure BHET powder (depolymerized polyethylene) as illustrated in FIG. 2.

Example 3 (Depolymerization of Mixed Textile Waste Containing Cotton and Polyester (CP MFW)—without Decolorization 2 g of MFW (CP MFW) was immersed in 75 g ethylene glycol and 75 g dimethylformamide and heated to 190° C. for 30 minutes to depolymerize the polyester component present in MFW to obtain a third filtrate containing bis(2-hydroxyethyl terephthalate) (BHET) monomer and third solids (PDP MFW). The third solids were cooled to room temperature to obtain a cooled third solids.

1.0306 g of the cooled third solids was further treated with 10 mass % oxalic acid solution (prepared by dissolving 10 g of oxalic acid in 100 ml of water) and heated to 50° C. for 3 hours to obtain the microcrystalline cellulose (depolymerized products).

The conversion of the MFW to the depolymerized products was 100%.

Figure 3:
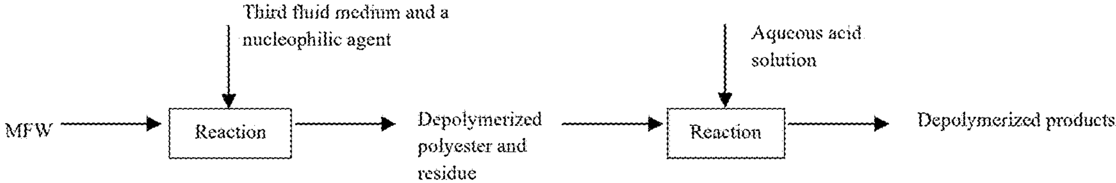
FIG. 3 illustrates the recycling of mixed textile waste by depolymerization of polyester followed by depolymerization of residue in accordance with the present disclosure.

FIG. 3 illustrates recycling of mixed textile waste by depolymerization of polyester followed by depolymerization of residue in accordance with the present disclosure.

Example 4 (Depolymerization of Mixed Textile Waste Containing Cotton and Polyester (CP MFW)—with Decolorization 50 g of MFW (CP MFW) was treated with 2.5 mass % aqueous sodium hydrogen sulphate (25 g sodium hydrogen sulphate in 1005 mL water) at a temperature of 140° C. for 4 hours to obtain decolorized textile waste (DC CP MFW). The decolorized textile waste was dried at 100° C. for 12 hours to obtain dried decolorized textile waste. 49 g of immersed in 380 g ethylene glycol and 380 g dimethylformamide and heated to 185° C. for 30 minutes to depolymerize the polyester component present in MFW to obtain a third filtrate containing bis(2-hydroxyethyl terephthalate) (BHET) monomer and third solids (PDP MFW). The third solids were cooled to room temperature to obtain a cooled third solids.

701 g of the third filtrate was subjected to rotary evaporation to recover the solvent mixture for recycling studies. 78 g of the concentrated third filtrate was subjected to oligomer separation. 295 g of water (anti-solvent) was added to the concentrated third filtrate to obtain a resultant mixture containing BHET in the dissolved form and oligomers as precipitates. The resultant mixture was filtered and the filtrate was fed to a crystallization unit to obtain pure BHET crystals.

24 g of the cooled third solids (PDP MFW) was further treated with 28 mass % sulphuric acid solution and heated to 50° C. for 1 hour to obtain the depolymerized products.

Example 5 (Single Step Depolymerization of the MFW with 1-Methylimidazole) (Comparative Example)

2 g of MFW was treated with 100 g of 1-methylimidazole (fluid medium) and heated to 180° C. for 4 hours to obtain a decolorized textile waste. The decolorized textile waste was dried to obtain a dried decolorized textile waste. 1.22 g of the dried decolorized textile waste was immersed in a 10 mass % oxalic acid solution (prepared by dissolving 10 g oxalic acid in 100 ml of water) at 150° C. for 3 hours to obtain depolymerized products. The conversion of the MFW to the depolymerized product was 100%.

Example 6 (Decolorization of the MFW with Sodium Hydroxide)

1 g of MFW was immersed in 10 mass % sodium hydroxide solution (prepared by dissolving 10 g sodium hydroxide in 100 ml of water) and heated to 150° C. for 4 hours to obtain a decolorized fabric. The so-obtained decolorized fabric was cooled to a room temperature (27° C.) to obtain a cooled decolorized fabric.

0.366 g of the cooled decolorized fabric was further immersed in 10 mass % oxalic acid solution (prepared by dissolving 10 g of oxalic acid in 100 ml of water) and heated to 150° C. for 4 hours to obtain depolymerized products.

The conversion of the MFW to the depolymerized products was 100%.

Figure 4:
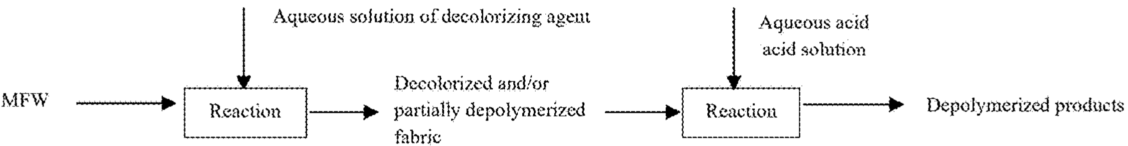
FIG. 4 illustrates the recycling of mixed textile waste by decolorization followed by depolymerization using organic acid solution in accordance with the present disclosure.

FIG. 4 illustrates recycling of mixed textile waste by decolorization followed by depolymerization using oxalic acid solution in accordance with the present disclosure.

Example 7 (Single Step Depolymerization) (Comparative Example)

2 g of MFW (mixed textile waste) was immersed in 10 mass % citric acid solution (10 g citric acid in 100 ml water) and heated to 200° C. for 3 hours to obtain depolymerized products.

The conversion of MFW to depolymerized products was 100%.

Figure 5:
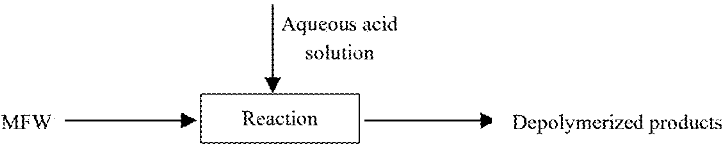
FIG. 5 illustrates the recycling of mixed textile waste by one pot depolymerization in accordance with the present disclosure.

FIG. 5 illustrates recycling of mixed textile waste by one pot depolymerization in accordance with the present disclosure.

Example 8

Example 8 was carried out in a manner similar to Example 1, except step 4, to obtain nylon, spandex, BHET and cotton.

Experiment 2: Optimization of the Recovery of Polymers from Mixed Textile Waste and Depolymerization Optimization of the First Fluid Medium Example 9

Figure 6:
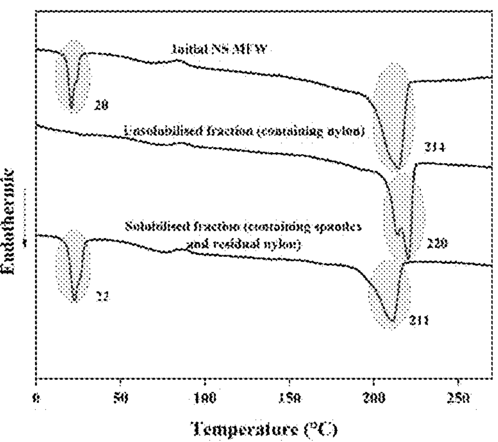
FIG. 6 illustrates a differential scanning calorimetry thermogram of insolubilized fraction in DMSO containing Nylon in accordance with the present disclosure.

In this experiment, 2 g of nylon-spandex containing MFW (NS MFW) was initially added to a round-bottom flask along with 100 g of dimethyl sulfoxide (DMSO) and heated to 100° C. for 2 hours to selectively solubilize spandex. It was observed that the spandex was completely soluble in DMSO along with some amount of nylon and the insolubilized fraction contained Nylon which was further confirmed by DSC as illustrated in FIG. 6.

From the DSC thermogram, it can be concluded that the insolubilized fraction contains nylon, as evidenced by the presence of an endothermic peak at 220° C. This finding is further confirmed by the detection of both nylon and spandex peaks in the solubilized fraction, with characteristic endothermic peaks at 211° C. and 22° C., respectively. These results indicate that a minimal amount of nylon is also being solubilized during the process. Therefore, there is a need to optimize the spandex dissolution process to ensure that only spandex is dissolved in DMSO, leaving the nylon fraction completely insolubilized.

Example 10

Figure 7:
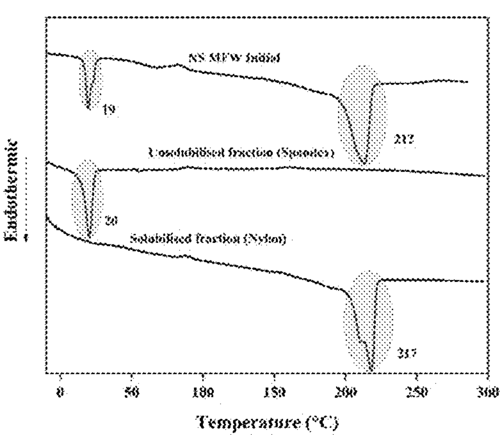
FIG. 7 illustrates a differential scanning calorimetry thermogram of solubilized fraction in formic acid (FA) containing Nylon in accordance with the present disclosure.

2 g of nylon-spandex containing MFW (NS MFW) was initially added to a round-bottom flask along with 100 g of formic acid (FA) and heated to a temperature of 70° C. for 2 hours. It is observed that the nylon was completely soluble, while the remaining insolubilized material was spandex which was further confirmed by DSC of both solubilized and insolubilized fraction. For conducting the DSC of solubilized fraction, the filtrate containing FA+Nylon was subjected to rotary evaporation for the recovery of FA. From the DSC thermogram, it is evident that nylon is soluble in formic acid, which can be seen by the presence of a melting peak of nylon at 217° C. for the solubilized fraction as illustrated in FIG. 7. This was further confirmed by the presence of an endothermic peak of spandex at 20° C. for the insolubilized fraction.

Example 11 (Depolymerization of Mixed Textile Waste and Recovery of Polymers from MFW)

10 g of mixed textile waste (MFW) containing cotton, polyester, nylon and spandex (CPNS MFW) was obtained. This mixture undergoes polyester depolymerization using 75 g of ethylene glycol (EG) and 75 g of dimethylformamide (DMF) at 185° C. for 30 minutes, resulting in reaction crude containing both solid and liquid fractions. The solid fraction contained the remaining fabric components (CNS MFW) [confirmed by DSC], while the liquid fraction contained BHET, which requires further processing for isolation and purification. The liquid fraction was first processed through rotary evaporation to recover excess solvents (fluid medium), leaving behind concentrated crude containing oligomers and BHET. Water was then added to this crude followed by stirring, which precipitates the oligomers while keeping BHET in solution. After filtering out the precipitated oligomers, the BHET solution undergoes crystallization to obtain isolated and purified BHET crystals.

Determination of Optimal Sequence for MFW Recycling

The optimal sequence for Mixed Textile waste (MFW) recycling has been optimized. To verify whether cotton (C) and polyester (P) fabrics dissolve in formic acid and THF, batch experiments were conducted under nylon dissolution and spandex dissolution conditions, respectively. The final weight of CP MFW remained unchanged, confirming that the initial solubilization process only affects nylon (FA treatment) and spandex (THF treatment).

Further experiments were performed to understand the behavior of nylon-spandex (NS) fabric when treated with ethylene glycol (EG) and dimethylformamide (DMF) under polyester depolymerization (PDP) conditions. When 5 g of NS MFW was processed with EG and DMF at 185° C. for 30 minutes, the residual fabric appeared in powder form with a final weight of 4.3 g. Although DSC thermogram analysis confirmed the presence of both nylon and spandex in the remaining solid after PDP treatment, these materials should not be subjected to high temperatures in the initial stages to preserve their value.

Additionally, the BHET obtained after the depolymerization of MFW contained residual color. This indicates that regardless of whether the fabric is decolorized initially, a BHET decolorization step using activated carbon treatment must be incorporated during isolation and purification of BHET to obtain white crystals.

Figure 8:
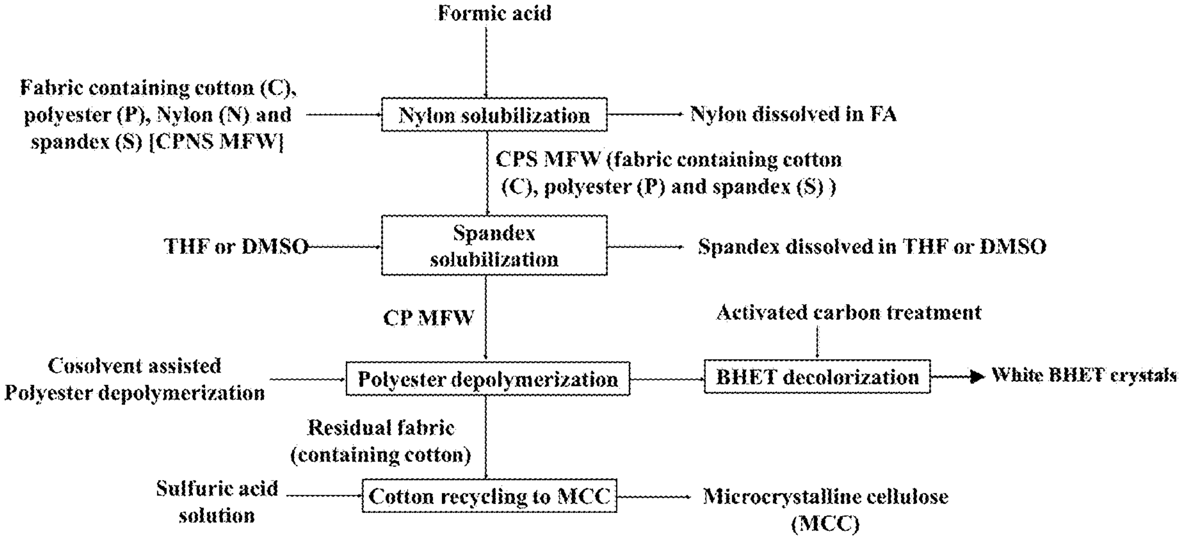
FIG. 8 illustrates optimized general process flow diagram for the optimal sequence in accordance with the present disclosure.

Therefore, the optimized treatment sequence for CPNS MFW recycling should follow this order: nylon solubilization, followed by spandex solubilization, then polyester depolymerization, and finally cotton recycling to microcrystalline cellulose (MCC) as illustrated in FIG. 8. Furthermore, the BHET obtained should undergo additional decolorization using activated carbon treatment.

Experiment 3: Characterization Studies

Figure 9:
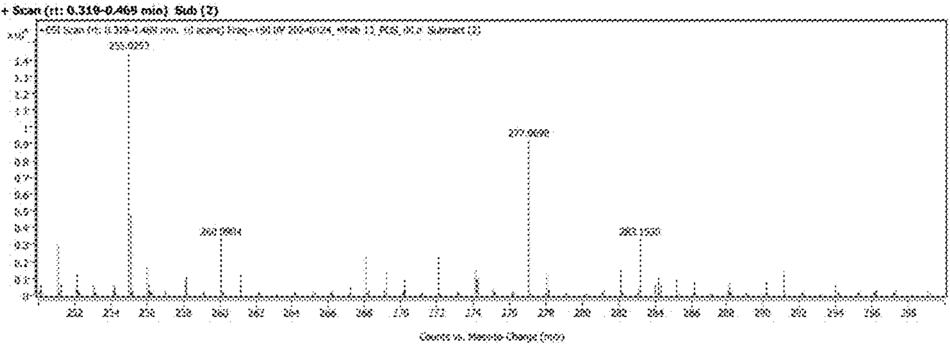
FIG. 9 illustrates the mass spectra (MS) of BHET in accordance with the present disclosure.

The depolymerization products obtained in Examples 1, 5, and 7 were characterized using mass spectrometry (MS) analysis, revealing a variety of compounds. The specific products formed depend on the polymer composition present in the mixed textile waste (MFW). Potential compounds include monomers derived from polyester, nylon (both Nylon 6 and Nylon 66), and cotton. Identified examples include terephthalic acid (TPA), the disodium salt of TPA, BHET, hexamethylene diamine (HMDA), adipic acid, glucose, sorbitol, caprolactam, aminocaproic acid, and similar compounds. The nature and composition of these depolymerization products are directly influenced by the original polymer makeup of the MFW. The mass spectra of the BHET obtained in step 3 of Example 1 confirmed the formation of BHET. This is evidenced by the presence of two characteristic peaks: an m/z peak at 255.02 corresponding to the protonated molecular ion [M+H] and an m/z peak at 277.06 corresponding to the sodium adduct [M+Na]. The mass spectra of the BHET is illustrated in FIG. 9.

For the confirmation of the presence of nylon in the first filtrate, the first filtrate containing formic acid and nylon was analyzed through differential scanning calorimetry (DSC). From the DSC thermogram, it is evident that nylon is soluble in formic acid (FA), which can be seen by the presence of a melting peak of nylon at 217° C. for the solubilized fraction as illustrated in FIG. 10*a*. The DSC thermogram analysis confirms that after FA treatment, the unsolubilized fraction contains only cotton, polyester and spandex. This is evidenced by the characteristic endothermic peaks observed for polyester at 246° C. and for spandex at 21° C. Further confirmation is provided by the DSC thermogram of the solubilized fraction, which contains only nylon, as indicated by the presence of an endothermic peak at 212° C. as illustrated in FIG. 10*b*.

DSC thermogram analysis of the second solids obtained in step (b) in Example 1 confirms that after THE treatment, the insolubilized fraction contains only cotton, polyester, and a small amount of spandex. This is evidenced by the characteristic endothermic peaks observed for polyester at 247° C. and a small peak for spandex at 23° C. Further confirmation for spandex dissolution is provided by the DSC thermogram of the solubilized fraction, which contains only spandex, as indicated by the presence of an endothermic peak at 23° C. This result shows that with increase in time for THE treatment may further aid in dissolving the residual spandex which will ultimately lead to the complete dissolution of spandex from a mixture of CPS MFW (fabric containing cotton, polyester and spandex) as illustrated in FIG. 11.

Experiment 4: Optimization of the Decolorizing Process

Effect of Decolorizing Agent

In the screening of decolorization agents, various compounds known for their bleaching properties were considered. The compound that showed the highest whiteness index was selected for further optimization experiments. This study was performed at the fixed operating condition i.e. at the reaction temperature of 150° C., reaction time of 4 hours, 10 g of MFW and 10 g of the corresponding decolorizing agent. The results are summarized in Table 1 below.

TABLE 1 effect of decolorizing agents on the whiteness index of the mixed textile waste

| S. No | Temperature (° C.) | Time (h) | Amount of MFW (g) | Decolorizing agent (10 g) | Whiteness index of MFW after decolorization (average of 10 values) |
|---|---|---|---|---|---|
| 1 | 150 | 4 | 10 | Sodium hydrogen sulphate | 44.58 |
| 2 | 150 | 4 | 10 | Sodium dithionite | 39.23 |
| 3 | 150 | 4 | 10 | Sodium sulfite | 37.27 |
| 4 | 150 | 4 | 10 | Potassium hydrogen phthalate | 25.12 |
| 5 | 150 | 4 | 10 | Calcium hypochlorite | 7.447 |
| 6 | 150 | 4 | 10 | Sodium dihydrogen phosphate | 18.02 |
| 7 | 150 | 4 | 10 | Potassium persulfate | 10.43 |
| 8 | 150 | 4 | 10 | Ammonium sulphate | 14.41 |
| 9 | 150 | 4 | 10 | Sodium thiosulphate | 12.81 |
| 10 | 150 | 4 | 10 | Sodium Lauryl sulfate | 14.88 |
| 11 | 150 | 4 | 10 | Sodium hydroxide | 30.86 |

Form Table 1 it is evident that sodium hydrogen sulphate is highly effective in its ability to decolorize MFW when compared to other decolorizing agents. This indicates that sodium hydrogen sulphate is particularly effective at breaking down and removing dyes present in MFW. In addition to sodium hydrogen sulphate, other agents such as sodium dithionite, sodium sulphite and sodium hydroxide also exhibit strong decolorizing properties, making them viable alternatives for decolorization operation.

Effect of Temperature

TABLE 2

Effect of temperature on the whiteness index of MFW

| Temperature (° C.) | Time (h) | Amount of MFW (g) | Decolorizing agent (10 g) | Whiteness index of MFW after decolorization (average of 10 values) |
|---|---|---|---|---|
| 100 | 4 | 10 | Sodium hydrogen sulphate | 40.01 |
| 120 | 4 | 10 | Sodium hydrogen sulphate | 42.16 |
| 140 | 4 | 10 | Sodium hydrogen sulphate | 44.69 |
| 150 | 4 | 10 | Sodium hydrogen sulphate | 44.58 |

The effect of temperature on the decolorization reaction was studied at different temperatures ranging from 100° C. to 150° C. It was observed that the best whiteness index was achieved at 140° C., which was selected for conducting further optimization experiments. As the temperature increased from 100° C. to 140° C., the whiteness index continuously improved and at 150° C., it remained the same as at 140° C. Therefore, it can be inferred that as the temperature increases, the whiteness index also increases till a constant value is reached (till 140° C.).

Effect of Time

A time study was performed to determine the optimized duration required for decolorization.

TABLE 3

Effect of time on the whiteness index of MFW

| Temperature (° C.) | Time (h) | Amount of MFW (g) | Decolorizing agent (10 g) | Whiteness index of MFW after decolorization (average of 10 values) |
|---|---|---|---|---|
| 140 | 1 | 10 | Sodium hydrogen sulphate | 18.07 |
| 140 | 2 | 10 | Sodium hydrogen sulphate | 33.63 |
| 140 | 3 | 10 | Sodium hydrogen sulphate | 40.08 |
| 140 | 4 | 10 | Sodium hydrogen sulphate | 44.69 |
| 140 | 5 | 10 | Sodium hydrogen sulphate | 40.04 |

It is observed that 4 hours yielded the best whiteness index. Additionally, with an increase in time, there is a significant increase in the whiteness index of MFW with 18.07 at 1 hour and 44.69 at 4 hours.

Effect of Amount of Decolorizing Agent

The amount of decolorizing agent was optimized to determine the optimum quantity. The optimization process was further conducted by using 5 g, 10 g, 15 g and 20 g of sodium hydrogen sulphate in 200 g of water, resulting in decolorizing agent concentrations of 2.5 mass %, 5 mass %, 7.5 mass % and 10 mass %, respectively.

TABLE 4

| Effect of amount of decolorizing agent on the whiteness index of MFW | | | | |
|---|---|---|---|---|
| Temperature | Time | Amount of MFW (g) | Amount of Sodium hydrogen sulfate (g) | Whiteness index of MFW after decolorization (average of 10 values) |
| 140 | 4 | 10 | 5 | 37.9041 |
| 140 | 4 | 10 | 10 | 44.69 |
| 140 | 4 | 10 | 15 | 44.78 |
| 140 | 4 | 10 | 20 | 43.86 |

It was observed that 10 g of decolorizing agent, i.e., a 5 mass % solution of sodium hydrogen sulphate, resulted in best whiteness index.

Experiment 5: Optimization of the Cotton Recycling Process

The optimization for the cotton recycling process was conducted using Design of Experiments (DoE), specifically using the Box-Behnken Design (BBD). Optimization was performed using Response Surface Methodology (RSM). Three factors were considered for optimization i. e. temperature, time and sulfuric acid concentration. For optimizing the cotton to MCC reactions, two responses were considered: % Crystallinity and % Yield of MCC.

Table 5 below shows the design matrix generated by the software along with the responses observed after conducting the experiments according to the designed matrix.

TABLE 5

| Design matrix and corresponding responses | | | | | | | | |
|---|---|---|---|---|---|---|---|---|
| Run | Reaction temperature (° C.) | Reaction time (h) | 98% $H_2SO_4$ concentration (%) | Acid amount (mL) | Water volume (mL) | Total volume (mL) | % Crystallinity of MCC | % Yield of MCC |
| 1 | 55 | 2.5 | 25 | 12.76 | 37.24 | 50 | 73.23 | 78.2 |
| 2 | 70 | 4 | 25 | 12.76 | 37.24 | 50 | 59.35 | 70.45 |
| 3 | 40 | 1 | 25 | 12.76 | 37.24 | 50 | 55.75 | 95.86 |
| 4 | 40 | 2.5 | 40 | 20.41 | 29.59 | 50 | 60.78 | 91.54 |
| 5 | 55 | 4 | 10 | 5.10 | 44.90 | 50 | 61.36 | 80.37 |
| 6 | 70 | 2.5 | 40 | 20.41 | 29.59 | 50 | 60.48 | 65.43 |
| 7 | 55 | 4 | 40 | 20.41 | 29.59 | 50 | 68.1 | 71.3 |
| 8 | 70 | 1 | 25 | 12.76 | 37.24 | 50 | 69.88 | 75.81 |
| 9 | 55 | 1 | 10 | 5.10 | 44.90 | 50 | 64.05 | 84.48 |
| 10 | 55 | 2.5 | 25 | 12.76 | 37.24 | 50 | 72.23 | 78.23 |
| 11 | 40 | 2.5 | 10 | 5.10 | 44.90 | 50 | 55.23 | 94.88 |
| 12 | 55 | 1 | 40 | 20.41 | 29.59 | 50 | 64.77 | 76.43 |
| 13 | 40 | 4 | 25 | 12.76 | 37.24 | 50 | 63.86 | 92.16 |
| 14 | 70 | 2.5 | 10 | 5.10 | 44.90 | 50 | 64.56 | 80.09 |

The term "design matrix" refers to the structured set of experimental runs generated using statistical design of experiments (DoE) methodology. In the context of the present disclosure, the design matrix is produced by Design-Expert software upon putting the relevant independent variables (factors) to be investigated, along with their respective operating ranges or levels. This matrix systematically outlines the combinations of factor levels for each experiment, enabling a comprehensive evaluation of the influence of multiple variables on the desired response parameters.

Experiment 6: Post Treatment for Decolorization of BHET

The so obtained BHET was decolorized in a manner similar to Example 1. It was observed that the isolated BHET was slightly orange in color as illustrated in FIG. 12(*a*) and the same colored BHET is further dissolved in hot water at 70° C. and subjected to Activated carbon (AC) treatment to obtain post-treated BHET, followed by recrystallization to obtain BHET crystals which were white in color FIG. 12(*b*).

Experiment 7: Recycling of the Decolorizing Agent

Recyclability study is essential for evaluating the economic feasibility of the process. This analysis also demonstrates how the chemicals can be reused rather than discharged into the environment, thereby achieving zero liquid discharge. Such recycling practices contribute to environmental sustainability by minimizing waste and maintaining cleaner environment.

TABLE 6

| pH and APHA values of SHS solution measured after various operations | | | | | | |
|---|---|---|---|---|---|---|
| | pH | | | APHA values | | |
| Recycle batch | Water used for decolorization | Water obtained after decolorization | AC treated water | Water used for decolorization | Water obtained after decolorization | AC treated water |
| R0 (fresh) | 5.47 | 5.56 | 5.14 | 10 | 500 | 70 |
| R1 | 5.35 | 5.09 | 5.16 | 50 | 450 | 30 |
| R2 | 5.41 | 4.89 | 4.80 | 10 | 300 | 8 |
| R3 | 5.21 | 5.01 | 4.54 | 10 | 200 | 8 |
| R4 | 4.56 | 4.94 | 4.86 | 8 | 300 | 10 |
| R5 | 4.97 | 3.89 | 4.88 | 10 | 300 | 70 |

The recyclability of sodium hydrogen sulphate (SHS) solution obtained for each decolorization reaction of MFW was studied. After every subsequent reaction, the APHA value and pH of the liquid was measured. After the measurement of these parameters, the liquid obtained is subjected to activated Carbon (AC) treatment in order to remove the dye from the crude water (obtained after MFW decolorization). This AC treated water was further utilized in the next batch by adding the remaining SHS solution (to make up to 150 mL SHS solution). In a similar manner, the water was decolorized and reused up to 5 cycles. The pH and APHA value of the solution obtained after decolorization, AC treated water and the water used in the next batch is shown in Table 6.

TECHNICAL ADVANCEMENTS

The present disclosure described herein above has several technical advantages including, but not limited to, the realization of a process for treating textile waste to recover polymers and depolymerization and recovery of monomers, that:

- is sequential/simultaneous;
- is environmentally sustainable;
- is efficient;
- is simple; and
- is economical.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveals the general nature of the embodiments herein that others can, by applying current knowledge, readily modify and/or adapt for various applications of such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for treating a textile waste, said process comprising the following steps:

a) mixing a textile waste in a first fluid medium under stirring at a temperature in the range of 40° C. to 120° C. for a time period in the range of 30 minutes to 240 minutes to obtain a first mixture comprising a first filtrate and first solids containing undissolved textile waste followed by separating to obtain a separated first filtrate and a separated first solids; and subjecting said separated first filtrate to a predetermined method to obtain nylon;

b) optionally mixing said separated first solids in a second fluid medium under stirring at a temperature in the range of 40° C. to 120° C. for a time period in the range of 30 minutes to 240 minutes to obtain a second mixture comprising a second filtrate and second solids containing undissolved textile waste followed by separating to obtain a separated second filtrate and a separated second solids; and subjecting said separated second filtrate to a predetermined method to obtain spandex;

c) depolymerizing said separated first solids or said separated second solids in a third fluid medium by using a nucleophilic agent at a temperature in the range of 170° C. to 200° C. for a time period in the range of 20 minutes to 150 minutes to obtain third mixture comprising a third filtrate and third solids containing undissolved textile waste followed by separating to obtain a separated third filtrate and a separated third solids; and subjecting said separated third filtrate to a predetermined method to obtain Bis(2-hydroxyethyl) terephthalate; and d) optionally treating said separated third solids in an aqueous acid solution at a temperature in the range of 30° C. to 80° C. for a time period in the range of 15 minutes to 240 minutes to obtain microcrystalline cellulose, wherein said first solids and said second solids are independently decolorized prior to or after depolymerization.

2. The process as claimed in claim 1, wherein said first solids, said second solids and said third solids are independently dried before subjecting to next step.

3. The process as claimed in claim 1, wherein a. said decolorization of said first solids prior to depolymerization is carried out by immersing said first solids in a decolorizing agent at a temperature in the range of 100° C. to 160° C. for a time period in the range of 1 hour to 6 hours followed by separating to obtain a decolorized product; and b. said decolorization of said second solids after depolymerization is carried out by immersing said second solids in a decolorizing agent at a temperature in the range of 100° C. to 160° C. for a time period in the range of 1 hour to 6 hours followed by separating to obtain a decolorized product.

4. The process as claimed in claim 1, wherein said predetermined method is at least one selected from the group consisting of cooling, filtration, rotary evaporation, drying, distillation, centrifugation, skimming, settling, by using agitated thin film dryer (ATFD), by using short path distillation unit (SPDU), and by adding an anti-solvent to obtain solids.

5. The process as claimed in claim 1, wherein said first fluid medium, said second fluid medium, said third fluid medium and said nucleophilic agent is recovered in each respective step.

6. The process as claimed in claim 1, wherein said first fluid medium is at least one selected from the group consisting of formic acid (FA), propanediol (PDO), dimethyl sulfoxide (DMSO), hydrogen peroxide, acetic acid, formic acid, chloro acetic acid, acrylic acid, benzoic acid, propionic acid, butyric acid, methacrylic acid, and isobutyric acid;

said second fluid medium is at least one selected from the group consisting of tetrahydrofuran (THF), N,N-dimethylformamide (DMF), N,N-dimethylacetamide (DMAc), dimethyl sulfoxide (DMSO) and N-methylpyrrolidone (NMP);

said third fluid medium is at least one selected from the group consisting of dimethylformamide, ethylamine, dimethylamine, aniline, pyridine and imidazole-based solvents; and said nucleophilic agent is at least one selected from ethylene glycol and water.

7. The process as claimed in claim 1, wherein said aqueous acid solution is at least one selected from the group consisting of aqueous acetic acid, aqueous citric acid, aqueous lactic acid, aqueous formic acid, aqueous oxalic acid, aqueous tartaric acid, aqueous sulphuric acid, and aqueous hydrochloric acid.

8. The process as claimed in claim 7, wherein the concentration of said aqueous acid solution is in the range of 5 mass % to 70 mass %.

9. The process as claimed in claim 3, wherein said decolorizing agent is at least one selected form the group consisting of aqueous sodium hydroxide, aqueous sodium dithionite, aqueous sodium hydrosulfide, aqueous sodium hydrogen sulphate, aqueous potassium hydroxide, aqueous calcium hydroxide, aqueous ammonia, aqueous sodium sulfite, aqueous sodium carbonate, 1-methylimidazole, aqueous potassium hydrogen phthalate, aqueous calcium hypochlorite, aqueous sodium dihydrogen phosphate, aqueous potassium persulphate, aqueous ammonium sulphate, aqueous sodium thiosulphate, and aqueous sodium lauryl sulphate.

10. The process as claimed in claim 1, wherein said depolymerization is done prior to the recovery of nylon, spandex and microcrystalline cellulose.

11. The process as claimed in claim 3, wherein said decolorization after depolymerization results in a slightly colored BHET which is further decolorized by dissolving said slightly colored BHET in water and heating to a temperature in the range of 60° C. to 80° C. followed by passing through an activated charcoal bed and subjecting to recrystallization to obtain white BHET crystals.

* * * * *